Patented Mar. 3, 1942

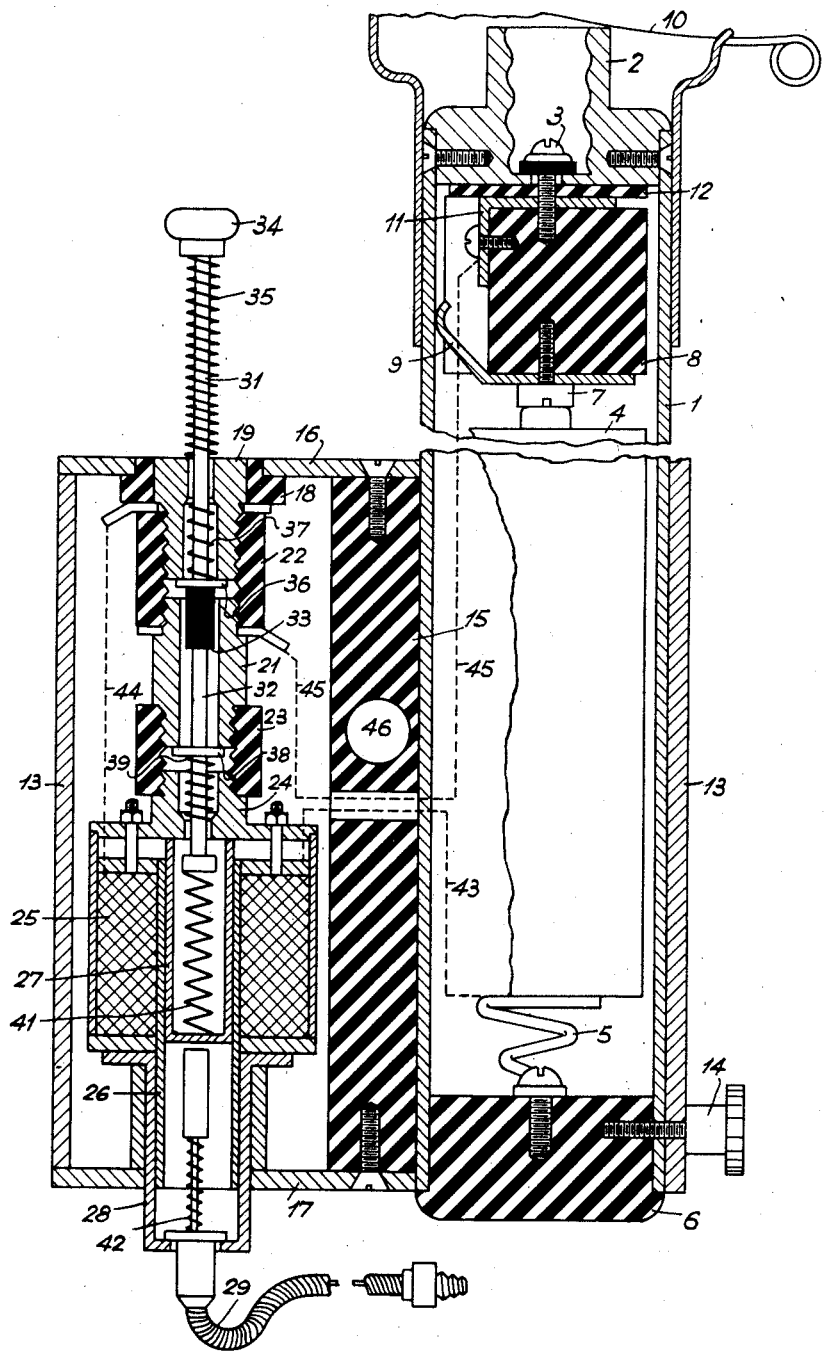

2,275,221

UNITED STATES PATENT OFFICE 2,275,221

FLASHLIGHT SYNCHRONIZING APPARATUS

Edward Arthur Herbert Goldring, Welwyn Garden City, England, assignor to Murphy Radio Limited, London, England Application May 6, 1940, Serial No. 333,553
In Great Britain May 20, 1939

3 Claims. (Cl. 67—29)

This invention is a method of, and apparatus for, synchronously operating a flash lamp and a photographic shutter, so that a shutter opening of very short duration may be caused with certainty to occur during the time of maximum illumination of the flash lamp.

A photographic shutter is commonly released by pressure on a nipple, and for convenience of operation the photographer usually actuates the shutter by pressure on a push connected with the shutter nipple by an encased cable known as a flexible release. The flash lamp commonly consists of metallic magnesium ignited by a filament brought to incandescence and caused to rupture by an electric current.

The method of the present invention is to hold the shutter against operation by the actuator, which is typically such a push as above suggested, by electromagnetic means and then to throw the igniter of the flash lamp into the circuit of the electromagnet. The excitation of the electromagnetic detent is interrupted by the fushion and rupture of the igniter, and the shutter is then released. In these flash lamps the rupture of the igniter is nearly coincident with the attainment of maximum illumination, for commonly rupture is brought about not solely by the heating effect of the electric current but by the additional heat of the actual flash. Hence to release the shutter at the instant of rupture of the igniter ensures that the shutter will be open when the maximum illumination occurs; for the interval between rupture of the igniter and maximum illumination, and the interval between shutter release and opening of the shutter being both minute, the small inevitable variations in these intervals as between one lamp and another and one shutter and another do not prevent attainment of the object in view, namely that with the shutter set for a short exposure, which is the condition under which synchronization is most difficult of attainment, its opening and closing will both occur during the period of maximum illumination.

The apparatus by which this method of synchronizing may most conveniently be put into operation has a spring interposed between the actuator and the shutter so that the actuator may move to a substantial extent notwithstanding that the shutter is held against release. It is so held by an electromagnet, and the movement of the actuator is utilized to operate switching means by which first the magnet is excited, and then the igniter of the flash lamp is thrown into its circuit. The igniter is thereby brought to incandescence and the lamp discharged; the igniter ruptures, breaking the magnet circuit, and the shutter is released.

A typical construction of such apparatus is shown in section in the accompanying drawing, which shows the appartus combined with a flash lamp—parts of which are broken away as unnecessary to the understanding of the invention.

The flash lamp shown has a tubular handle 1 which is also its battery container. At the upper end the handle carries a screw socket 2 for the flash lamp bulb and a reflector 10. The bulb, being of any well-known form, is not shown; the socket 2 and the centre contact 3 may be taken as the terminals of the igniter. The dry battery 4 used as a source of supply has one pole contacting with the spring 5 secured in an insulating block 6 closing the end of the battery casing, and the other pressed by that spring against a stud 7 in an insulating block 8 into which the centre contact 3 screws; a leaf spring 9 fastened to the block 8 by the stud 7 makes connection between this pole of the battery and the casing 1, and through the casing with the socket 2 which is secured in the end of the casing. The centre contact 3 is insulated from the socket 2, and screws through a metal strip 11 fastened to the block 8 and separated from the socket by insulation 12.

The synchronizing apparatus is built for combination with this lamp in a sheet metal casing 13 which wraps around the casing 1 and is fastened to it by a screw 14 which may also serve to hold in place the block 6. Within the casing 13 is fastened a block of insulation 15 and to this the top and bottom, 16 and 17, of the casing are fastened.

In the top 16 of the casing, insulated from it by a collar 18 there is mounted a metal sleeve 19. This is mechanically secured to, but electrically insulated from, an aligned sleeve 21 by a threaded sleeve of insulating material 22. A second threaded sleeve of insulating material 23 similarly attaches the sleeve 21 to a metal cap 24 closing one end of a casing containing a solenoid or electromagnet winding 25. This casing and the cap 24 may preferably be of iron to increase the magnetic field. Within the solenoid is a sleeve 26, within which freely slides an armature or core 27, shown as tubular in form and closed at its lower end. The tube 26 enters a fitting 28 which is secured in the casing 13 and is adapted to receive and retain the end of the sheath 29 of a flexible shutter release.

In the sleeve 19 and cap 24 there slides a composite push rod, consisting of two metal rods 31 and 32 connected by an insulating junction piece 33. Upon the outer end of the rod 31 is a push button 34, and between this push button and the top 16 of the casing 13 a spring 35 is wound about the rod. On the inner end of the rod 31 there is a freely sliding metal washer 36 pressed towards or against the junction piece 33 by another spring 37 wound around the rod; this washer is of a size to seat itself upon the end of the sleeve 21. A similar washer 38 is similarly mounted on the rod 32 and pressed towards or against the lower end of the sleeve 21 by a spring 39. The lower end of the rod 32 is enlarged to slide with suitable clearance in the tubular armature 27, and between this enlarged end and the closed end of the armature is a helical spring 41. On the under side of the end of the armature abuts the wire 42 of the flexible release.

The broken lines show electrical connections, actually made by insulated wires. The lead 43 connects one pole of the battery 4 to one terminal of the solenoid 25; lead 44 connects the other end of the solenoid to the sleeve 19; lead 45 connects the sleeve 21 to the centre contact 2 of the flash lamp; the cap 24 is in electrical connection with the terminal 7 through the magnet casing, the casing 13, the casing 1 and the spring 9.

A hole 46 through the spacing block 15 and casing 13 admits the passage of a screw by which the synchronizing apparatus and lamp may be secured to the camera by its usual tripod socket.

The apparatus operates as follows: On depression of the push 34 against the action of the spring 35 the washer 36 is first permitted to contact with the sleeve 21. An exciting circuit is thereby completed from the lower pole of the battery 4 through lead 43, solenoid 25, lead 44, sleeve 19, spring 37 and rod 31, washer 36, sleeve 21, washer 38, spring 39, cap 24, and the metal casings, to the upper pole of the battery. The solenoid therefore holds its core 27 in substantially the position of maximum flux. Further depression of the push 34 involves compression not only of the return spring 35 but also of the spring 41 between the enlarged end of rod 32 and the core or armature 27. Such further depression presently brings the insulating junction piece 33 upon the washer 38, and immediately thereafter thrusts the washer away from contact with the sleeve 21. The circuit above set out is not thereby wholly interrupted, but from sleeve 21 now extends through lead 45 and the flash lamp igniter to the upper pole of battery 4. Consequently the igniter is heated up, and the illuminant is ignited, whereupon the igniter ruptures. The circuit is now wholly broken, the solenoid is no longer excited, and under the thrust of the compressed spring 41 it operates quickly thrusting before it the wire 42 of the flexible release.

While the use of a flexible shutter release affords the operator some useful freedom of movement its particular location in the apparatus is not essential. It could be between the press button 34 and the rod 31, or between the rod 32 and the armature 27. In the latter case the synchronizing apparatus would be made in two parts, the shutter-controlling magnet being conveniently attached to the shutter, and the switching devices made up of the sleeves 19 and 21, and cap 24 with their associated parts being mounted in a casing held in the hand.

I claim:

1. The combination with a flash lamp having a battery-fed igniter caused to incandesce and rupture by the passage of current through it, of means for synchronously operating said flash lamp and a photographic shutter, comprising a casing attached to said flash lamp, an actuating push sliding against spring action in said casing, a solenoid in said casing, a core moveable within said solenoid and aligned with said actuating push, a spring interposed between said push and said core, a flexible shutter release connected with said casing and adapted to be connected with the shutter having its wire abutting upon said armature, means connecting said solenoid in series with the igniter of said flash lamp and its battery, contacts adapted to be brought together by depression of said push included in the circuit of said battery, and further contacts adapted to be separated by further depression of said push connected with the terminals of said igniter.

2. Means for synchronously operating a photographic shutter and a flash lamp which is discharged by the incandescence and fusion of an igniter heated by the passage of electric current through it, comprising an actuator for operating the shutter, a spring interposed between said actuator and the shutter, electromagnetic means which, when excited, detain the shutter against operation by the actuator, a source of electric current, switching means operated by the initial movement of the actuator relative to the shutter and serving to close a circuit from said source through said electromagnetic means, and further switching means operated by the actuator after compression of the spring between actuator and shutter and serving to bring into said circuit the igniter of the flash lamp, whereby the flash lamp igniter is made incandescent and ruptured, and the electromagnetic means thereby de-energized, releasing the shutter.

3. Means for synchronously operating a photographic shutter and a flash lamp which is discharged by the incandescence and fusion of an igniter heated by the passage of electric current through it, comprising an actuator for releasing the shutter, an electromagnet operating when excited to prevent release of the shutter, a source of electric current connected in series with the flash lamp igniter and said electromagnet, and switching means also operated by the actuator including a pair of normally separated contacts inserted in the circuit of said source and a pair of contacts short-circuiting said igniter, the actuator first bringing together the former pair of contacts and thereby exciting said electromagnet and causing detention of the shutter, and subsequently separating the latter pair of contacts thereby bringing the igniter into circuit and causing discharge of the lamp and, upon rupture of the igniter, de-energization of said electromagnet and release of the shutter.

EDWARD ARTHUR HERBERT GOLDRING.